United States Patent [19]

Carter

[11] Patent Number: 4,772,136

[45] Date of Patent: Sep. 20, 1988

[54] SELF-FILTERING APPARATUS FOR HYDRODYNAMIC BEARING GAS

[76] Inventor: Donald L. Carter, 2316 Donna Dr., Vestal, N.Y. 13850

[21] Appl. No.: 159,354

[22] Filed: Feb. 23, 1988

[51] Int. Cl.$^4$ ............................................. F16C 17/10
[52] U.S. Cl. ........................................ 384/112; 384/473
[58] Field of Search ............... 384/112, 473, 123, 107, 384/120, 368

[56] References Cited

U.S. PATENT DOCUMENTS

| | | | |
|---|---|---|---|
| 3,399,000 | 8/1968 | Remmers | 384/112 |
| 3,837,716 | 9/1974 | Allen et al. | 384/112 |
| 3,950,039 | 4/1976 | Huber et al. | 384/112 |
| 4,427,308 | 1/1984 | Sandberg | 384/123 |

*Primary Examiner*—Lenard A. Footland
*Attorney, Agent, or Firm*—Kenneth P. Johnson

[57] ABSTRACT

Gas bearing of the hydrodynamic self-acting type in which replenishment gas for the support film is drawn by the operating bearing through filter means as required to assure entrapment of potentially damaging particles before they can enter the gas film in the narrow clearance between the rotating and stationary bearing members. To further increase the flow of filtered gas, the bearing elements may optionally be equipped with supplemental gas pumping apparatus.

11 Claims, 1 Drawing Sheet

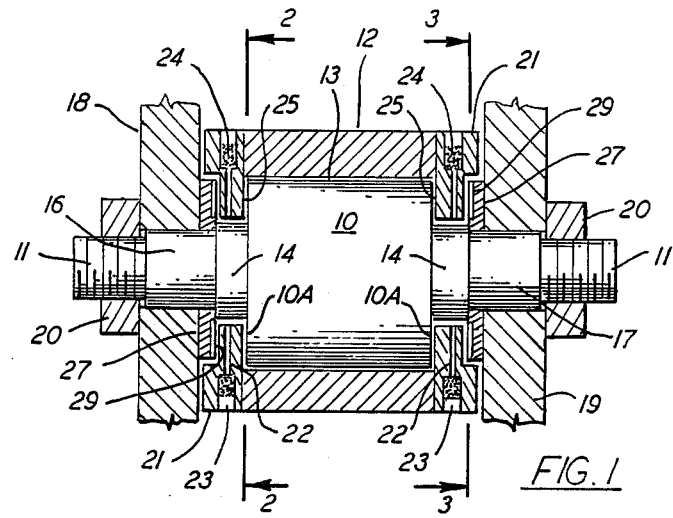
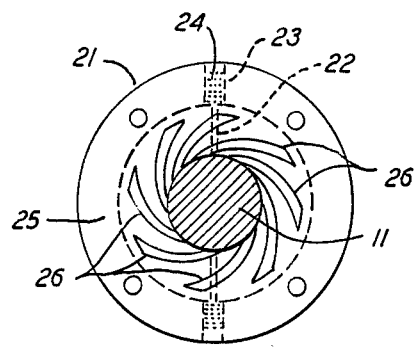
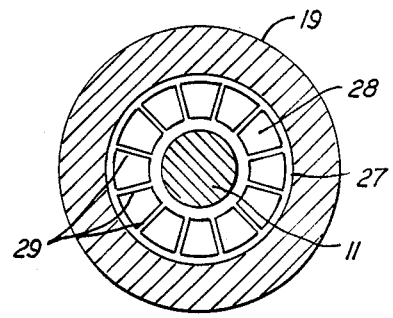
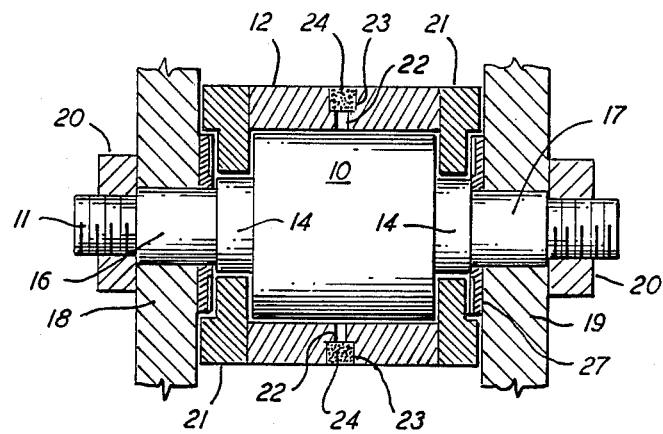

SELF-FILTERING APPARATUS FOR HYDRODYNAMIC BEARING GAS

FIELD OF THE INVENTION

This invention relates generally to hydrodynamic or self-acting gas bearings, and more particularly to bearing arrangements in which the replenishment gas is drawn through a filter as required by the operating bearings.

BACKGROUND OF THE INVENTION

Low friction, self-acting gas bearings rely on the relative rotation of the bearing members to form the supporting bearing film from the ambient atmosphere. This atmosphere is usually air, but may be other gases if the bearing is sufficiently isolated. The gap or clearance between the surface of the rotating member and that of the stationary member is frequently on the order of one hundred microinches. Gas borne particles larger than this size can be sucked or drawn into the dynamically changing film and damage one or both of the mating bearing surfaces.

In some gas bearings, the gas required for the supporting film is supplied directly to the bearing from a pressurized source and is known as jacking fluid. Gas entering the source can be selected or filtered to prevent the entrance of oversized particles. Self-acting gas bearings, however, are usually started, stopped, and operate in an environment that includes the bearing drive or load or is amidst wear particles that are produced by nearby mechanisms. It then becomes difficult to insure that replenishment gas for the bearing film is clear of occasional oversize particles that can spall or gouge the bearing surface.

Attempts have been made to trap the damaging bits with filters in self-acting gas bearings, but the filters have been placed either at the entrance to the mechanism chamber enclosing the bearing, drive and load, which are themselves particle generators, or have been placed at the exit for the gas from the bearing. Typical of such arrangements are U.S. Pat. Nos. 4,656,545, issued Apr. 7, 1987 to K. Kakuta and 4,547,081, issued Oct. 15, 1985 to K. Tanaka et al. In each of these references, the gas for the supporting bearing film is either filtered as it enters a chamber enclosing a motor and disc drive or after the gas has passed through a drive motor and the gas bearing. The bearing gas is filtered too late to intercept wear or dirt particles and prevent them entering the narrow gas film opening crucial to bearing operation.

OBJECTS AND SUMMARY OF THE INVENTION

It is accordingly a primary object of this invention to provide a hydrodynamic gas bearing for which ambient gas entering the bearing is required to be drawn through filtering means immediately prior to use as a support film in the bearing to insure that the gas is free of damaging particles.

Another important object of this invention is to provide a method of supplying filtered gas for hydrodynamic journal or thrust bearings to which the filtered gas is supplied according to the demand of the bearings.

Yet another important object of this invention is to provide a pumping arrangement for the gas supply of a hydrodynamic or self-acting thrust or journal bearing in which a surplus of filtered gas is drawn adjacent to the bearing to further assure that unfiltered gas is not consumed in the bearing.

The foregoing objects are attained in accordance with the present invention by providing thrust or journal hydrodynamic or self-acting gas bearings with gas pumping means for their necessary support film supply and limiting the supply channels for the gas to only paths that incorporate filtering means. The filtering means is capable of removing airborne particles of sizes sufficient to damage the bearing components. The gas pumping means is of a capacity to draw the required gas or an excess quantity of gas to the entrance to the bearing opening and thus prevent unfiltered ambient gas and particles from entering the bearing gaps.

The present inventive arrangement has the advantage of avoiding bearing shielding or confinement or the requirement that the bearing be supplied with externally pressurized gas. Pumping capability can be easily and inexpensively provided for the hydrodynamic bearings. Since the demand for replacement gas is not great in high quality hydrodynamic bearings, the supply channels and filtering means do not require significant structure and can be kept small. Bearing clearance can be minimized since filtered gas is assured.

Additional objects, features and advantages of the invention will become apparent from the following, more particular description of a preferred embodiment of the invention with reference to the accompanying drawing.

BRIEF DESCRIPTION OF THE DRAWING

FIG. 1 is sectional elevation view of a hydrodynamic gas bearing incorporating a filter arrangement constructed in accordance with the principles of the invention;

FIG. 2 is sectional view taken along the line 2—2 shown in FIG. 1;

FIG. 3 is a sectional view taken along the line 3—3 in FIG. 1; and

FIG. 4 is a modification of the embodiment of the invention shown in FIGS. 1-3.

DESCRIPTION OF THE PREFERRED EMBODIMENT

Referring to the figures, right circular cylinder 10 is fixed on an input/output shaft 11 and rotates within stationary journal sleeve 12 on a film of gas in the narrow gap or clearance 13. The gas film in this instance may be assumed to be air from the ambient atmosphere, and the film is formed by the relatively rotating adjacent surfaces of the cylinder and sleeve. The air film serves as the supporting lubricant as in a typical gas or air bearing. The sleeve and cylinder are finished to geometric accuracies of ten microinches and are dimensioned to provide a radial gap of approximately 100 microinches.

Shaft 11 has annular shoulders 14 and surfaces 16, 17 to which exemplary driving or driven elements 18, 19 can be secured by nuts 20. For example, element 18 can be the rotor of a drive motor and element 19 may be a magnetic disc hub or fan. Sleeve 12 has secured at either end thereof an end plate 21 that accomodates shoulder 16 or 17 of the rotating shaft with clearance. Each end plate is formed with at least one radially extending channel 22 and counterbore 23 that communicates with the end plate opening at a shoulder 14 of the shaft. In FIG. 1, two oppositely disposed channels 22 have been shown in each end plate 21 and additional ones may be provided. Each counterbore 23 is filled with suitable submicron filter material 24, such as "Microfibre" from Balston, Inc., Lexington, Mass., that will intercept airborne particles equal to or larger than those expected to damage the inner surface of sleeve 12 or outer surface of cylinder 10 rotating adjacent to the sleeve.

Inner face 25 of each end plate 21 lying next to the ends 10a of cylinder 10 is formed with a plurality of spiral or "Whipple" grooves or flutes 26, best seen in FIG. 2. These grooves are commonly used to pump the gas and produce a supporting end thrust film at the cylinder ends that serve as thrust bearings. Gas is also urged into the journal bearing. The grooves extend only part way along the coextensive surfaces of endplates 21 and cylinder 10. Clamped between each shoulder 14 and input or output element 18 or 19 is a washer 27 having on its face 28 adjacent to shoulder 14 a pattern of radial ribs 29, FIG. 3, that serve to evacuate gas from the opening near shoulder 14. The ribs pump the gas outwardly between element 18 or 19 and end plate 21 to insure a surplus flow of gas through channels 22. Ribs 29 can be of various configuration, such as those forming grooves 26 on face 25 of end plate 21 or the washer surface can be plain. Pumping action will still occur since pumping depends on speed, clearance and washer diameter. The clearance between shoulders 14 and the mating openings in end plates 21, and the washer 27 and the end plate is much larger than that of the bearing air gap between sleeve and cylinder or between end plate and cylinder. The bearing clearance may be only a fifth or tenth that of the other clearances.

In operation, cylinder 10 and its shaft 11 are rotated within stationary sleeve 12 by an input source of energy, such as element 18. The relative motion between the ends of cylinder 10 and journal sleeve 12 with its end plate grooves 26 forms a radial support gas film and end thrust gas film on which the cylinder and shaft move. The pumping grooves or flutes 26 urge the gas into the thrust bearing and journal bearing gap, thus drawing any replenishment gas from the shoulder-end of channels 22 after the gas has passed through filters 24. This assures entrapment of potentially damaging particulate prior to its entry into the radial and thrust bearings. Gas is also forced outward between end plates 21 and input or output elements 18 and 19. The larger clearances, however, decrease the effective pumping action so that the gas is drawn in continually and slowly through channels 22, but without producing a significant negative pressure or overcoming the pumping of grooves 26. The outward flow of gas away from the bearing film assures that any necessary gas has been filtered.

In a different embodiment, in FIG. 4, gas supply channels 22, counterbores 23 with filters 24 can be placed near the center of journal sleeve 12 between end plates 21 and grooves 26 can be reversed and arranged to pull gas through the filters into the journal first, then between the thrust surfaces of the ends of cylinder 10 and end plates 21, and out to the atmosphere adjacent shoulders 14. Washers 27 would continue to provide an exhaust function for the gas as it passes from the journal through the thrust bearings. A region of decreased atmospheric pressure is created in the journal bearing in this embodiment.

The self-cleaning gas bearing described above can be modified in several other aspects: for example, the bearing may be oriented with shaft 11 being vertical or at some other acute angle with respect to the horizontal; this would require only a single thrust bearing. Although the bearing has been illustrated with a rotating cylinder 10, sleeve 12 may be rotated instead; self-cleaning is functional with relative rotation of the bearing members. Pumpimg grooves 26 can be formed on the ends 10a of cylinder 10, and along with ribs 29 can be modified as necessary to provide the desired bearing film of gas flow through the supply channels. In addition, the number and location of channels 22 can be varied to meet the particular bearing arrangement.

Even though the illustrative bearing has been disclosed as an air bearing, the entire mechanism can be enclosed in an atmosphere of another gas and function as described. Manufacturing devices may have to operate in gas atmospheres, such as nitrogen, and the filtering arrangement of the invention is equally effective in these environments.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. Apparatus for filtering the gas supplied to a self-acting gas bearing comprising:
    bearing sleeve means having a cylindrical journal surface and a thrust surface;
    cylinder means relatively rotatable with respect to said bearing sleeve means and having a cylindrical surface and end surface each cooperating respectively with said journal and thrust surfaces with clearances therebetween to form a gas film journal bearing and gas film thrust bearing;
    gas pumping means in said thrust bearing for providing gas for said films in said journal and thrust bearings and producing a region of decreased gas pressure in one of said bearings within the ambient gas; and
    supply channel means for said gas having an inlet open to said ambient gas and an outlet open to said region and filter means therebetween through which said ambient gas is drawn and filtered immediately prior to entering said region.

2. Apparatus as described in claim 1 wherein said cylinder means has attached thereto supplemental pumping means coacting with said bearing sleeve means to increase the quantity of ambient gas drawn through said supply channel means over that drawn by said first gas pumping means.

3. Apparatus as described in claim 1 wherein said supply channel means is formed in said bearing sleeve means.

4. Apparatus as described in claim 1 wherein said supply channel means is arranged to supply filtered ambient gas first to said thrust bearing surface.

5. Apparatus as described in claim 1 wherein said supply channel means is arranged to supply filtered ambient gas first to said journal bearing.

6. Apparatus as described in claim 1 wherein said gas pumping means is formed by flutes in surfaces of one of the two mating, relatively moving surfaces of said gas film thrust bearing.

7. Apparatus as described in claim 1 wherein said filter means includes material capable of intercepting atmospheric particulate greater in dimension than the gas film thickness in the clearances of said thrust and journal bearings.

8. Apparatus as described in claim 1 wherein said bearing sleeve means includes means for partially closing both ends of said journal surface to form a pair of said thrust surfaces, said gas pumping means includes means for providing gas for said films at said pair of thrust surfaces, said cylinder means coacts identically with said pair of thrust surfaces and said pumping means to produce said gas film and region of decreased pressure at each thrust bearing, and said supply channel means has filter means to supply filtered gas to both of said regions.

9. The method of supplying filtered ambient gas to hydrodynamic gas bearings having combined thrust and journal bearings for a rotatable cylinder comprising the steps of:
forming gas pumping flutes in said thrust bearing for pumping gas through said thrust and journal bearings to provide supporting films for said cylinder;
providing, a gas supply channel having an inlet for ambient gas, an outlet adjacent said thrust bearing and filter means therebetween; and
rotating said cylinder to pump gas into said bearings and form a region of decreased gas pressure to draw filtered replenishment gas through said supply channel as bearing gas is used.

10. The method as described in claim 9 further comprising the step of placing supplemental gas pumping means adjacent said thrust bearing to draw excess gas through said supply channels to produce a positive pressure region near said channel outlet and prevent entry of unfiltered ambient gas into said region.

11. Apparatus for filtering gas supplied to a hydrodynamic gas bearing comprising:
bearing sleeve means having a cylindrical journal bearing surface and a first thrust bearing surface partially closing one end of said journal bearing surface;
cylinder means relatively rotatable on a hydrodynamic gas film in said bearing sleeve means having a cylindrical bearing surface coacting with said journal surface and a second thrust bearing surface coacting with said first thrust bearing surface;
gas pumping means on at least one of said thrust bearing surfaces for pumping gas between said coacting surfaces and creating a region of decreased fluid pressure;
supply channel means for gas including filter means therein having an inlet in the ambient gas and an outlet at said region of reduced pressure whereby ambient filtered gas is drawn to said pumping means.

* * * * *